(12) United States Patent
Susumu et al.

(10) Patent No.: US 7,726,965 B2
(45) Date of Patent: Jun. 1, 2010

(54) NOZZLE GATE OPENING AND CLOSING TIMING ADJUSTING MECHANISM FOR MULTIPLE GATE INJECTION MOLDING MACHINE

(75) Inventors: Saito Susumu, Tokyo (JP); Mori Mei, Tokyo (JP); Ohno Makoto, Tokyo (JP)

(73) Assignee: Fisa Corporation, Tokyo (JP)

( * ) Notice: Subject to any disclaimer, the term of this patent is extended or adjusted under 35 U.S.C. 154(b) by 182 days.

(21) Appl. No.: 12/081,846

(22) Filed: Apr. 22, 2008

(65) Prior Publication Data

US 2008/0279973 A1 Nov. 13, 2008

(30) Foreign Application Priority Data

May 8, 2007 (JP) .............................. 2007-123021

(51) Int. Cl.
*B29C 45/23* (2006.01)

(52) U.S. Cl. ....................................... 425/564; 425/566

(58) Field of Classification Search ................. 425/562, 425/563, 564, 565, 566
See application file for complete search history.

(56) References Cited

U.S. PATENT DOCUMENTS

| | | | | |
|---|---|---|---|---|
| 4,285,661 A | * | 8/1981 | Yotsutsuji et al. | ........... 425/563 |
| 5,470,219 A | * | 11/1995 | Yokoyama et al. | ........... 425/144 |
| 5,846,466 A | * | 12/1998 | Abe et al. | ................... 264/259 |
| 5,996,618 A | * | 12/1999 | Saito | ........................... 137/543 |
| 6,824,379 B2 | * | 11/2004 | Doyle et al. | ................. 425/564 |
| 7,326,048 B2 | * | 2/2008 | Saito et al. | ................... 425/563 |

FOREIGN PATENT DOCUMENTS

| | | |
|---|---|---|
| JP | 05-237879 | 9/1993 |
| JP | 2004-017564 | 1/2004 |
| JP | 2004-050425 | 2/2004 |

\* cited by examiner

*Primary Examiner*—Tim Heitbrink
(74) *Attorney, Agent, or Firm*—Roylance, Abrams, Berdo & Goodman, L.L.P.

(57) ABSTRACT

The object of the present invention is to provide a nozzle gate opening and closing timing adjusting mechanism used for multiple gate injection molding machine. And, a mechanism of the present invention is characterized that a nozzle gate opening and closing timing adjusting mechanism for use in a multiple gate injection molding machine having a plurality of resin injecting nozzles, each having disposed therein a gate pin that opens and closes a nozzle gate, the nozzle gates being opened by the gate pins when, in filling with a resin, a resin pressure exceeds a predetermined value and the nozzle gates being closed by the gate pins when the resin pressure falls below a predetermined value, the nozzle gate opening and closing timing adjusting mechanism comprising: timing pins, disposed at all or a portion of surfaces of an injection mold opposing the respective nozzle gates and advancing and retracting toward and from the nozzle gates; and opening and closing timings of the plurality of nozzle gates being adjusted by the nozzle gates being opened and closed by the timing pins directly or indirectly via the gate pins.

10 Claims, 7 Drawing Sheets

(A)

(B)

(C)

(A)

(B)

(C)

(A)

(B)

(C)

(A)

(B)

(C)

NOZZLE GATE OPENING AND CLOSING TIMING ADJUSTING MECHANISM FOR MULTIPLE GATE INJECTION MOLDING MACHINE

FIELD OF THE INVENTION

The present invention relates to a nozzle gate opening and closing timing adjusting mechanism used for multiple gate injection molding machine, and more specifically relates to a nozzle gate opening and closing timing adjusting mechanism for a multiple gate mold, with which filling from each of a plurality of nozzles is adjusted to enable large molded products or sets of large and small molded products in a stable state to be produced in multiple gate molding of a single-cavity molded product with a large projected area or in so-called family molding, where a plurality of molded products that differ in resin filling amount and weight proportion are molded simultaneously.

BACKGROUND OF THE INVENTION

In the field of injection molding for resin products, molds having multiple gates are used for multiple gate molding of single-cavity molded products with a large projected area or for so-called family molding, where a plurality of molded products that differ in resin filling amount and weight proportion are molded simultaneously, and with such a multiple gate arrangement, filling amounts from a plurality of nozzles must be adjusted to control and move locations of formation of weld lines of a molded product to desired positions and filling from the respective nozzles must be adjusted to enable sets of large and small molded products to be produced with stability.

For adjustment and control of filling amounts from a plurality of nozzles, for example, a filling amount of each nozzle is adjusted by changing an amount of resin injected from each nozzle gate as described in following Patent Documents D1 to D3.

D1: Japan Patent Prepublication No. 2004-50425
D2: Japan Patent Prepublication No. 2004-17564
D3: Japan Patent Prepublication No. H5-237879

SUMMARY OF THE INVENTION

With the art described in Patent Document D1, a blocking pin is made to enter inside a runner, which is a resin flow path, and an injection amount is adjusted and controlled according to an amount of entry of the blocking pin.

However with this art, because the blocking pin is screwed into a valve seat from the runner side, a mold must be disassembled to adjust the amount of entry of the blocking pin, and there is a demerit in that each time readjustment is necessary, procedures of disassembly→adjustment of entry amount→assembly→injection molding→confirmation of filling amount must be repeated and thus a significant amount of trouble and time are required.

With the art described in Patent Document D2, a pressure receiving surface, urged by a spring, is made to advance and retract inside a runner to adjust and control an injection amount.

However with this art, because a filling pressure during resin injection varies according to resin type, temperature, and various other conditions, there is a demerit that it is extremely difficult to adjust and control the injection amount of each nozzle gate while achieving balance with the urging force on the pressure receiving surface.

With the art described in Patent Document D3, a plurality of nested members that differ in orifice shapes are combined as needed and installed inside a runner to adjust and control an injection amount.

However, with this art, because disassembly must be performed to exchange the nested members, there is a demerit in that each time readjustment is necessary, procedures of disassembly→exchange of nested members→assembly→injection molding→confirmation of filling amount must be repeated and thus a significant amount of trouble and time are required.

Furthermore, because the adjustment of the injection amount is restricted by the orifice shapes of the nested members that are made available in advance, the adjustment is restricted to a stepped adjustment. There is thus a demerit that if a desired injection amount cannot be obtained by the nested members that are made available in advance, the adjustment is not possible unless a new nested member is manufactured.

It was thus troublesome and difficult to adjust the resin filling amounts injected from the respective nozzle gates by changing the flow amounts of molten resin supplied to the respective nozzles.

Thus an object of the present invention is to provide a nozzle gate opening and closing timing adjusting mechanism for multiple gate injection molding machine that enables resin filling amounts injected from respective nozzle gates to be changed without changing flow amounts of molten resin supplied to respective nozzles.

To achieve the above object, the present invention provides the following arrangements.

[1] A nozzle gate opening and closing timing adjusting mechanism for use in a multiple gate injection molding machine having a plurality of resin injecting nozzles, each having disposed therein a gate pin that opens and closes a nozzle gate, the nozzle gates being opened by the gate pins when, in filling with a resin, a resin pressure exceeds a predetermined value and the nozzle gates being closed by the gate pins when the resin pressure falls below a predetermined value, the nozzle gate opening and closing timing adjusting mechanism comprising: timing pins, disposed at all or a portion of surfaces of an injection mold opposing the respective nozzle gates and advancing and retracting toward and from the nozzle gates; and opening and closing timings of the plurality of nozzle gates being adjusted by the nozzle gates being opened and closed by the timing pins directly or indirectly via the gate pins.

[2] The nozzle gate opening and closing timing adjusting mechanism for multiple gate injection molding machine according to the above [1], wherein each nozzle gate is opened by escaping of the gate pin from the nozzle gate, and each nozzle gate is closed by returning of the gate pin toward the nozzle gate.

[3] The nozzle gate opening and closing timing adjusting mechanism for multiple gate injection molding machine according to the above [1], wherein each nozzle gate is opened by projecting of the gate pin from the nozzle gate, and each nozzle gate is closed by returning of the gate pin toward the nozzle gate.

[4] The nozzle gate opening and closing timing adjusting mechanism for multiple gate injection molding machine according to any of the above [1] to [3], wherein each nozzle gate is closed from an exit side by a timing pin advancing toward the opposing nozzle gate and contacting the gate and is opened by the timing pin retracting from the nozzle gate, and the opening and closing timings of the plurality of nozzle gates are adjusted by individually controlling the advancing and retracting of the timing pin opposing each nozzle gate.

[5] The nozzle gate opening and closing timing adjusting mechanism for multiple gate injection molding machine according to the above [1] to [3], wherein each nozzle gate is closed by a timing pin advancing toward the opposing nozzle gate and contacting and thereby restricting the projection of the gate pin from the nozzle gate and is opened by the timing pin retracting from the nozzle gate, and the opening and closing timings of the plurality of nozzle gates are adjusted by individually controlling the advancing and retracting of the timing pin opposing each nozzle gate.

[6] The nozzle gate opening and closing timing adjusting mechanism for multiple gate injection molding machine according to any of above [1] to [3], wherein an advancing stroke amount of each timing pin is adjustable.

[7] The nozzle gate opening and closing timing adjusting mechanism for multiple gate injection molding machine according to any of the above [1] to [3], wherein the timing pins are disposed at a movable mold.

[8] The nozzle gate opening and closing timing adjusting mechanism for multiple gate injection molding machine according to any of the above [1] to [3], wherein, before start of resin filling, one to all of the timing pins are made to advance to close one to all of the nozzle gates, and at the start of resin filling, a resin inject-able state is attained by making any timing pin, among the one to all of the timing pins closing the nozzle gates, retract at any timing and thereby opening a corresponding nozzle gate.

[9] The nozzle gate opening and closing timing adjusting mechanism for multiple gate injection molding machine according to the above [8], wherein during resin filling, any nozzle gate is forcibly closed by making a corresponding timing pin advance.

[10] The nozzle gate opening and closing timing adjusting mechanism for multiple gate injection molding machine according to the above [8] to [9], wherein during resin filling, any timing pin is adjusted in advancing stroke amount and made to advance to an intermediate position to adjust an injection flow amount of the resin from a corresponding nozzle gate.

With the first or eighth aspect of the present invention, locations of formation of weld lines of a molded product can be controlled and moved to desired positions by changing the resin filling amounts injected from the respective nozzle gates not by changing the flow amounts of molten resin supplied from the respective nozzles but by advancing and retracting any timing pin and thereby adjusting the opening and closing timings of the corresponding nozzle gate. That is, with the present invention, because it suffices that the locations of formation of the weld lines of the molded product be controlled and moved to the desired positions, that is, it suffices that it be possible to change the resin filling amounts from the respective nozzles, any nozzle gate does not have to be closed completely by the advancing of the corresponding timing pin and there is no need to completely prevent the leakage of the molten resin in the closed state.

The second aspect of the present invention can be applied to an injection molding machine having a nozzle with an arrangement where a nozzle gate is opened by a gate pin escaping from the nozzle gate.

The third aspect of the present invention can be applied to an injection molding machine having a nozzle with an arrangement where a nozzle gate is opened by a gate pin projecting from the nozzle gate.

With the fourth aspect of the present invention, by the nozzle gate opening and closing arrangement, in which each nozzle gate is closed by advancement toward the nozzle gate and each nozzle gate is opened by retraction from the nozzle gate, the nozzle gate opening and closing timings can be adjusted without making any changes whatsoever in the arrangement, setting conditions, etc., of each nozzle itself.

With the fifth aspect of the present invention, by the arrangement where the opening and closing of the nozzle gates are performed by adjusting the opening and closing timings of the nozzle gates by restricting the operations of the gate pins, the nozzle gate opening and closing timings can be adjusted without making any changes whatsoever in the arrangement, setting conditions, etc., of each nozzle itself.

With the sixth or tenth aspect of the present invention, the flow amounts of resin injected from the nozzle gates can be adjusted readily by adjusting the advancing stroke amounts of the timing pins and without changing the flow amounts of the molten resin supplied to the nozzles.

With the seventh aspect of the present invention, good workability is provided in regard to adjustment, exchange, maintenance, etc., of the timing pins.

With the ninth aspect of the present invention, the timing of stopping of injection of resin from any nozzle gate can be controlled.

DESCRIPTION OF PREFERRED EMBODIMENTS

The present invention shall now be described in further detail in accordance to the attached drawings.

Figure 1:
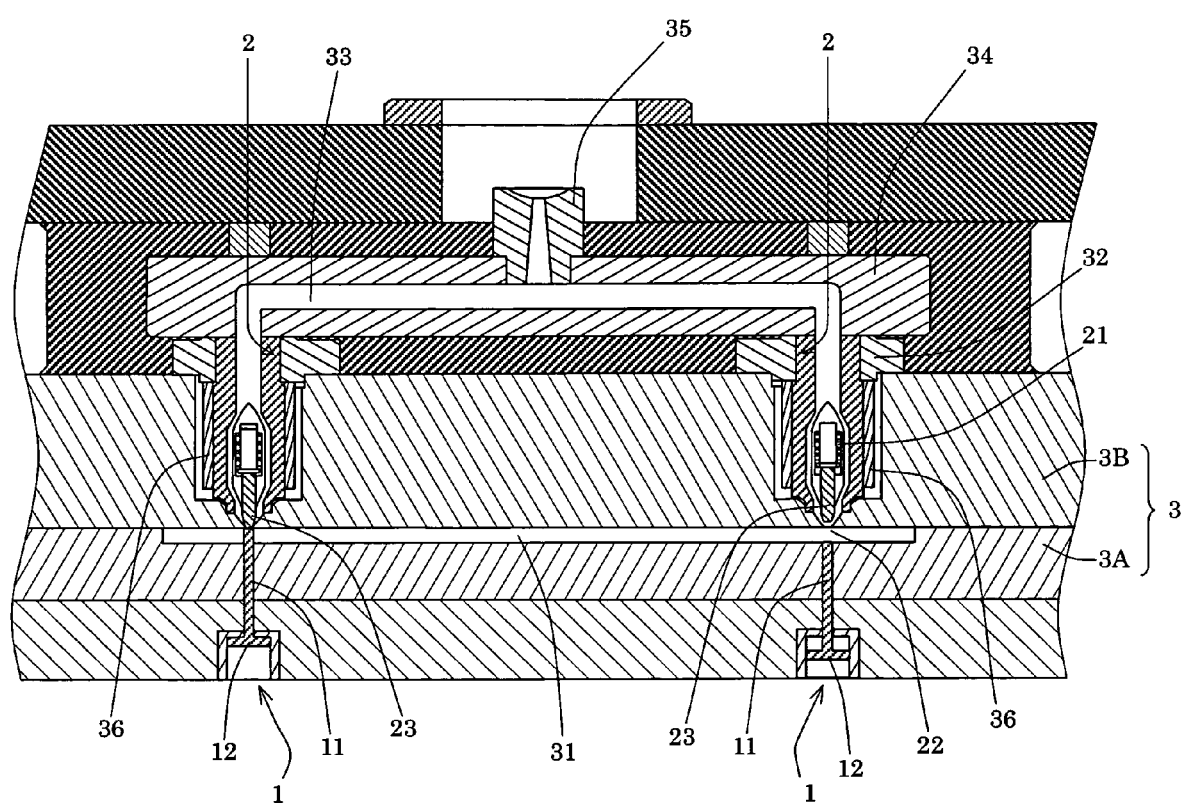
FIG. 1 is a schematic sectional view of an embodiment of the present invention.

In FIG. 1, an opening and closing timing adjusting mechanism 1 for respective nozzle gates of a multiple gate injection molding machine (may hereinafter be referred to simply as "opening and closing timing adjusting mechanism") 1 adjusts opening and closing timings of respective nozzle gates 22 of a multiple gate injection mold 3 that has a plurality (two in the present embodiment) of nozzles 2, each having a structure that makes use of a difference between a pressing force of a spring 21 and a filling pressure of a molten resin to move a gate pin 23 and thereby open or close a corresponding nozzle gate 22. Although the gate pin 23 may be referred to as a "piston," the term, "gate pin," is used unifyingly in the present invention.

The opening and closing timing adjusting mechanism 1 has timing pins 11, which are disposed at portions of the multiple gate injection mold 3 opposing the nozzle gates 22 and each of which has a tip shape enabling closure of the corresponding nozzle gate 22. The respective timing pins 11 advance toward the respective nozzle gates 22 from the opposing positions to contact the nozzle gates 22 and thereby close the nozzle gates 22 (see FIG. 2A), and retract from the respective nozzle gates 22 to open the nozzle gates 22 (see FIG. 2B).

With the present invention, because the opening and closing timings of the respective nozzle gates 22 can be adjusted respectively by controlling the advancing and retracting of the respective timing pins 11, locations of formation of weld lines of a molded product can be controlled and moved to desired positions by setting an injection starting timing and an injection ending time for each nozzle 2 and thereby adjusting a filling amount from each nozzle 2 respectively.

Each timing pin 11 is preferably made to advance and retract by hydraulic pressure, pneumatic pressure, electromagnetic force, etc., and more preferably by an air cylinder (symbol 12 in FIG. 1) using pneumatic pressure.

Figure 7:
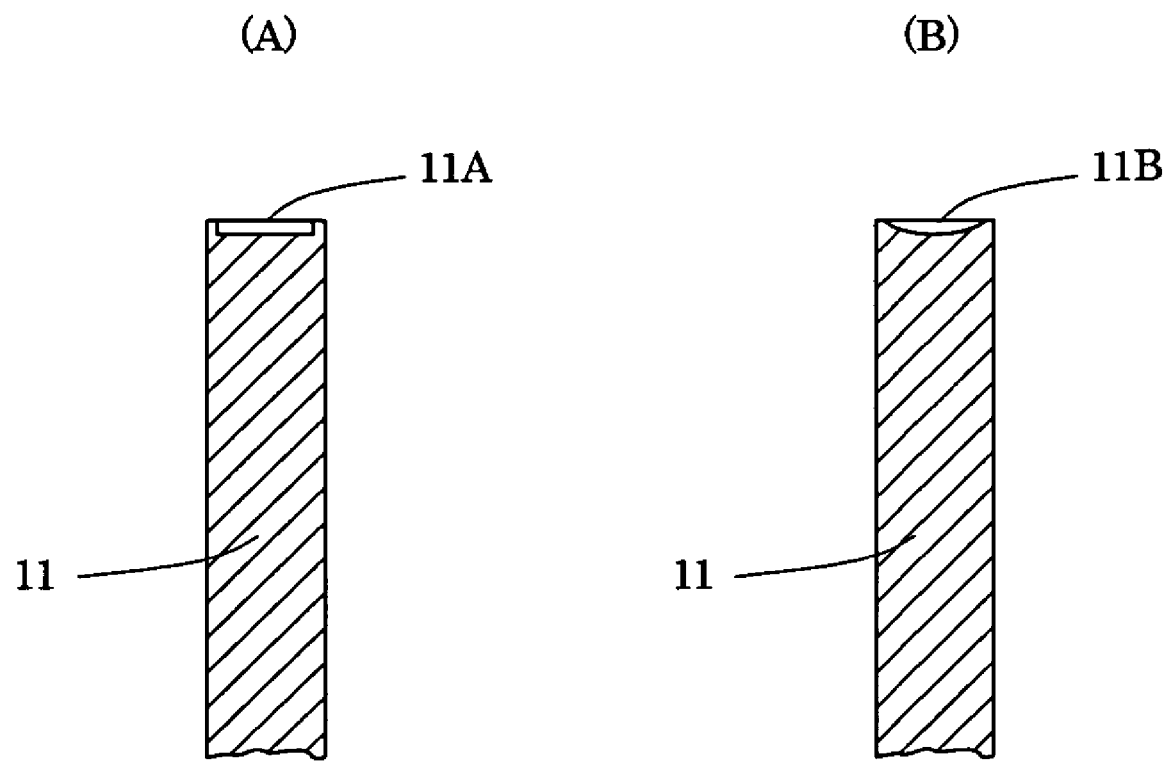
FIG. 7 is front view showing timing pins of other preferred embodiments of the present invention.

The tip shape of each timing pin 11 may be any shape enabling closure of the corresponding nozzle gate 22 upon contact with the nozzle gate 22, and although the tip may have a flat shape or a shape enabling entry into the nozzle gate 22, the tip preferably has a shape with a recess 11A formed as shown in FIG. 7A. By the recess 11A being formed, collision of the tip of the timing pin 11 and the tip of the gate pin 23 can be prevented when the timing pin 11 advances and contacts the nozzle gate 22. With the present invention, because it suffices that the locations of formation of the weld lines of the molded product be controlled and moved to the desired positions, that is, it suffices that it be possible to change the resin filling amounts from the respective nozzles 2, any nozzle gate 22 does not have to be closed completely by the advancing of the corresponding timing pin 11, and there is no need to completely prevent leakage of molten resin in the closed state. Thus as the tip shape of the timing pin 11, a shape that can completely close the nozzle gate 22 is not essential and a shape that can roughly close the gate is sufficient.

The nozzle 2, to which the opening and closing timing adjusting mechanism 1 according to the present invention can be applied, may be any nozzle other than that of an open gate arrangement, that is, the nozzle 2 may be any of publicly known or used nozzles having a structure where the gate pin 23 opens and closes the nozzle gate 22. For example, the nozzle may be a publicly known or used structure with which the nozzle gate 22 is opened and closed by pneumatic pressure, hydraulic pressure, or spring arrangement, etc.

Figure 2:
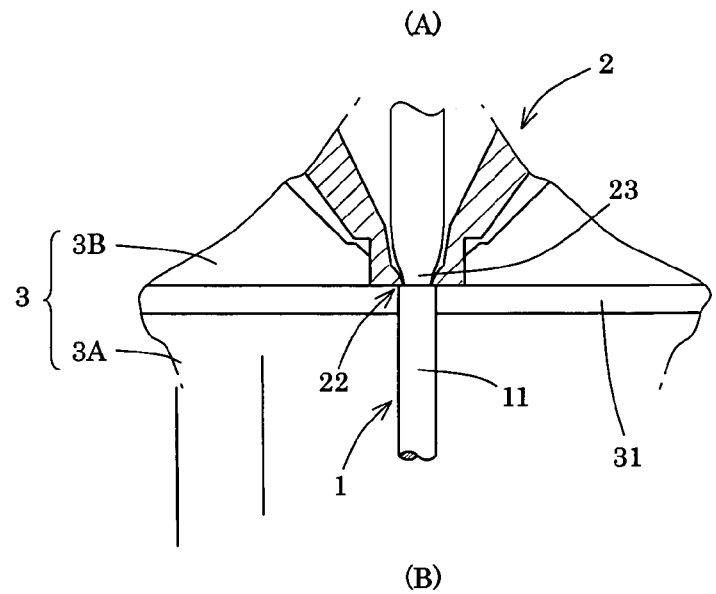
FIG. 2 is schematic explanatory diagram showing operation position states of a timing pin in a nozzle gate shown in FIG. 1.
Figure 2:
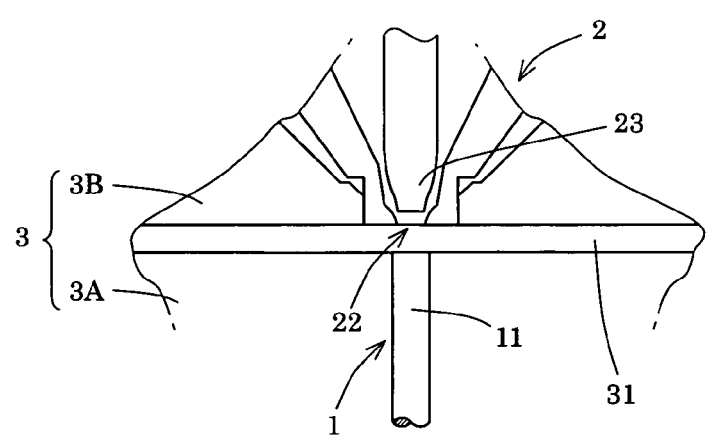
Figure 2:
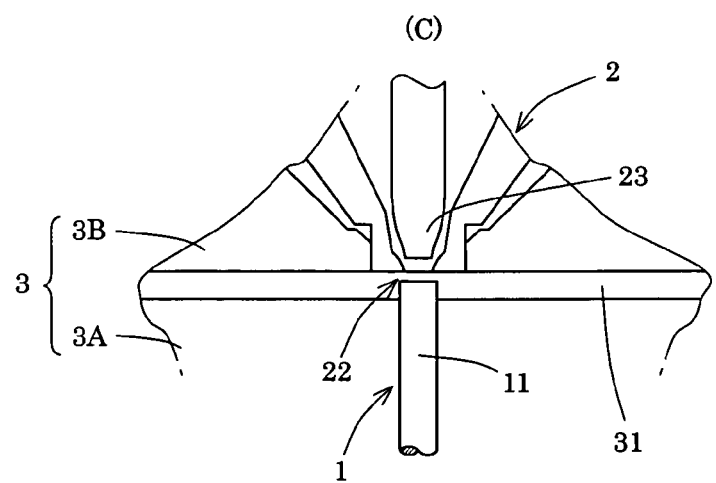
Figure 3:
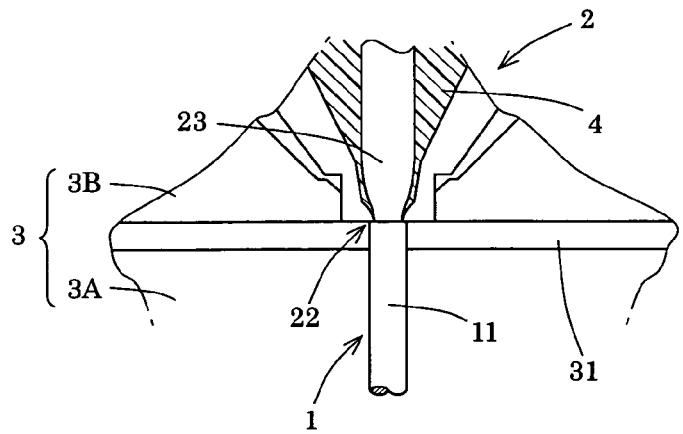
FIG. 3 is schematic diagram showing the gate of FIG. 2 filled with resin.
Figure 3:
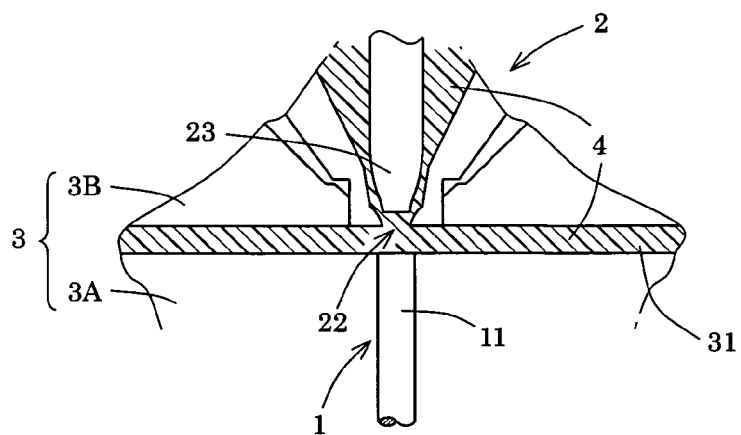
Figure 3:
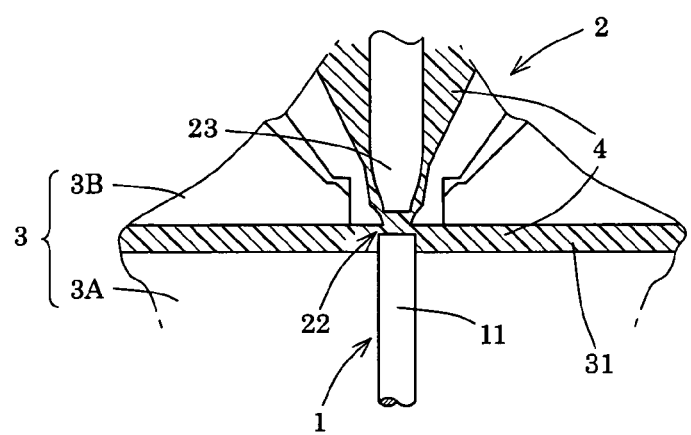

Most preferably, the nozzle 2 has a structure for opening and closing the nozzle gate 22 of the nozzle 2 where, as shown in FIGS. 1 to 3, the gate pin 23, disposed inside the nozzle 2, is moved according to a resin pressure inside the nozzle 2 and against the pressing force of the spring 21 so that when, during filling of a resin, the resin pressure exceeds a predetermined value, the gate pin 23 escapes from the nozzle gate 22 to open the nozzle gate 22, and when the filling of the resin is completed and the resin pressure falls below a predetermined value, the gate pin 23 moves (returns) in the nozzle gate 22 direction and blocks the nozzle gate 22. Arrangements described in Japanese Patent Nos. 2850203, 3236538, and 3253551, Japanese Published Unexamined Patent Application No. Hei 10-52837, and Japanese Patent Application Nos. 2004-218246 and 2004-246263, etc., which are prior arts by the present applicant, can be cited as specific examples.

The nozzle 2 is not restricted to the above mentioned arrangements and may be of any arrangement other than the open gate arrangement, with which there is a problem that the nozzle gate cannot be made large, that is, the nozzle 2 may be any of publicly known or used arrangements put in practice in an injection molding machine that uses a nozzle with a structure where a needle valve is opened and closed by pneumatic pressure, hydraulic pressure, or spring arrangement, etc.

As shown in FIG. 1, the multiple gate injection mold 3 is constituted of a movable mold 3A and a fixed mold 3B, and preferably, the opening and closing timing mechanism 1 according to the present invention is disposed at the movable mold 3A. In FIG. 1, symbol 31 indicates a cavity, 32 indicates a flange, 33 indicates a runner channel, 34 indicates a manifold, 35 indicates a sprue bush, and 36 indicates a heater that regulates the temperature of the molten resin.

Operation position states of the timing pin 11 during closing and opening of the nozzle gate 22 shall now be described based on FIGS. 2 and 3 (with FIGS. 2A and 3A showing a closed state, FIGS. 2B and 3B showing an open state, and FIGS. 2C and 3C showing a half-open state). FIGS. 2A to 2C and 3A to 3C show the same arrangement, with FIG. 2 showing states with the molten resin omitted from illustration and FIG. 3 showing states with the molten resin 4 being illustrated.

Before start of filling of the molten resin 4, the timing pin 11 is made to advance and put in contact with the nozzle gate 22 to close the nozzle gate 22 (the state shown in FIGS. 2A and 3A). Although all of the plurality of nozzle gates 22 may be closed by the advancing of the timing pins 11 before the start of filling of the molten resin 4, for a nozzle gate 22 that is to be opened precedingly, the corresponding timing pin 11 may be put on standby at an original position without being advanced. In this case, the timing of opening of the nozzle gate 22 is adjusted by movement of the gate pin 23 that blocks the nozzle gate 22. That is, a timing of start of injection by the nozzle 2 itself is the filling starting timing. An arrangement, where, for the nozzle gate 22 that is to be opened precedingly, the provision of the opening and closing timing adjusting mechanism 1 at a portion opposing the nozzle gate 22 is omitted, is also included in the present invention.

Next, with the start of filling of the molten resin 4, first, the timing pin 11 that closes the nozzle gate 22 of the nozzle 2, from which filling is to be started precedingly, is retracted to open the nozzle gate 22 (the state of FIGS. 2B and 3B). By injection from the nozzle 2 being started at the same time as the opening or at a timing earlier than the opening, the molten resin 4 flows from the nozzle 2 precedingly and the filling is started. After elapse of a suitable time thereafter, the timing pin 11, closing the nozzle gate 22 of the nozzle 2, from which filling is to be started next at a suitable timing, is retracted to open the nozzle gate 22 and the filling of the molten resin 4 from this next nozzle 2 is started (the state of FIGS. 2B and 3B).

Preferably, the timing of the opening of the nozzle gate 22 by the escaping of the gate pin 23 of the nozzle 2 (that is, the timing of start of injection from the nozzle 2 itself) and the timing of the opening of the nozzle gate 22 by the retracting of the timing pin 11 that closes the nozzle gate 22 are simultaneous. However, the timing of the opening of the nozzle gate 22 by the escaping of the gate pin 23 of the nozzle 2 may be earlier than that of the opening by the timing pin 11. This is because even if the timing of the nozzle 2 itself is earlier, the nozzle gate 22 is closed by the timing pin 22 and thus even though the nozzle 2 is in a state in which it can start injecting, the molten resin 4 is blocked at the nozzle gate 22 portion by the timing pin 11.

Although with the present embodiment, filling is performed while changing the opening and closing timings of the two nozzles 2 and the opening of the nozzle gates 22 by the timing pins 11 is performed in two timing stages, injection molding to which the present invention is applied is not restricted thereto, and the invention can be applied to cases where filling is performed from three or more nozzles 2 in three or more timing stages.

At the end of filling of the molten resin 4, although the timing pin 11 stays at the original position at least until the molded product is taken out in the case where the opening and closing timing adjusting mechanism 1 is disposed in the cavity 31 as in the present embodiment, in a case where the mechanism is disposed not inside the cavity 31 but in a resin flow path, etc., in communication with the cavity 31, the timing pin 11 may be advanced with the end of filling. Also in this case, by making the timing pin 11 advance at a timing earlier than the end of injection by blocking of the nozzle 2 by the gate pin 23, the nozzle gate 22 can be closed forcibly. The nozzle gate 22 is opened and closed by the advancing and retracting of the timing pin 11, and preferably, an advancing stroke amount of the timing pin 11 is adjustable. During resin filling, the injection flow amount of the molten resin 4 from any nozzle gate 22 can be adjusted by adjusting the advancing stroke amount of the corresponding timing pin 11 and making the timing pin advance to an intermediate position. FIGS. 2C and 3C show a state where the timing pin 11 is adjusted in advancing stroke amount and thereby advanced to a position approximately ⅔ of the way to contacting the nozzle gate 22.

In addition to adjusting the opening and closing timings of the respective nozzle gates 22 by controlling the advancing and retracting of the plurality of timing pins 11, by adjusting the projection stroke amount of any timing pin 11 during filling of the molten resin 4, the filling amounts of the molten resin 4 from the respective nozzles 2 can be controlled more finely. With the present embodiment, all nozzle gates 22 are matched in the opening timing and made to start filling at the same time. However, the present invention is not restricted thereto, and the advancing stroke amount of just any timing pin 11 may be changed to change the filling amount of the molten resin 4 from the corresponding nozzle 2.

Although an embodiment of the nozzle gate opening and closing timing adjusting mechanism for multiple gate injection molding machine according to the present invention was described above, the present invention is not restricted to the above-described embodiment and, for example, the following modes may also be employed.

Figure 4:
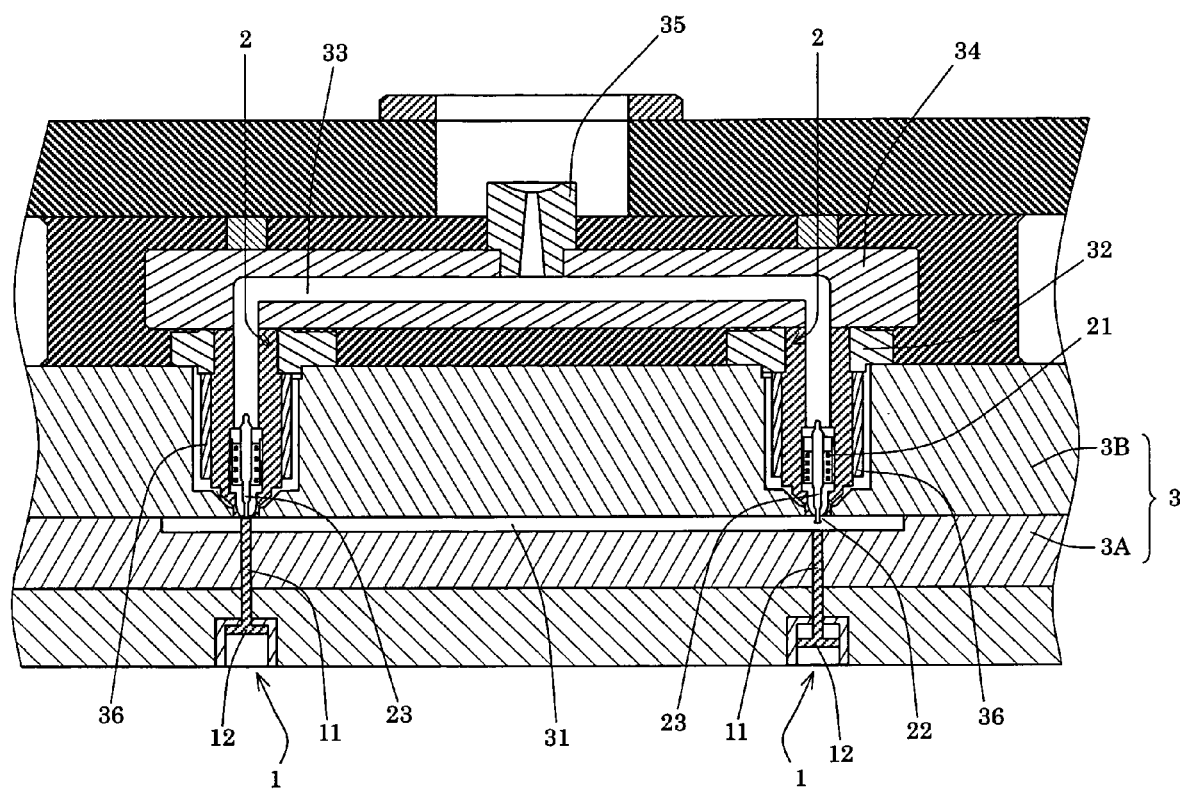
FIG. 4 is a schematic sectional view of another embodiment of the present invention.
Figure 5:
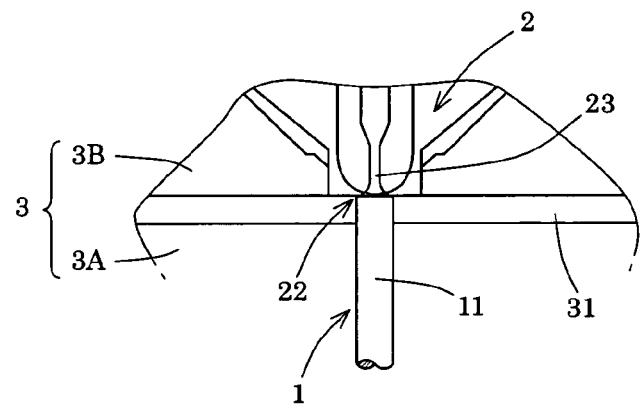
FIG. 5 is schematic explanatory diagrams showing operation position states of a timing pin in the nozzle gate shown in FIG. 4.
Figure 5:
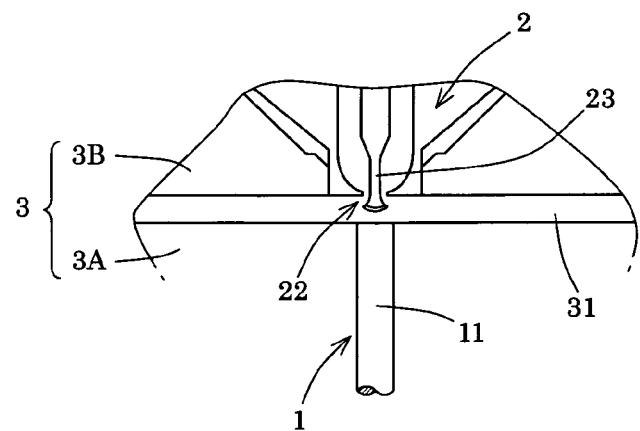
Figure 5:
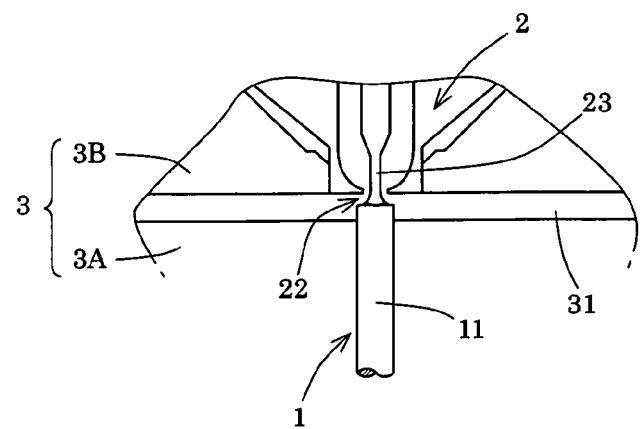
Figure 6:
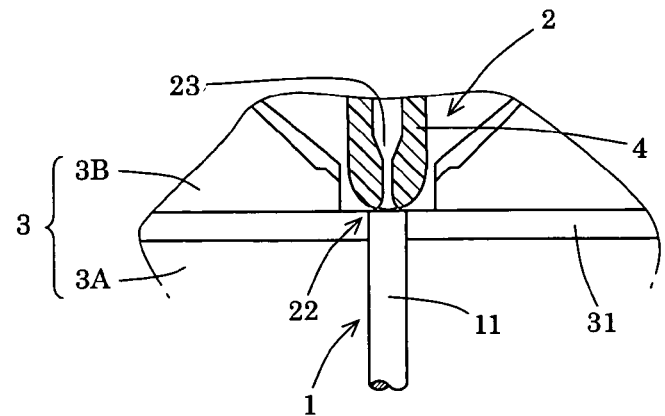
FIG. 6 is schematic diagrams showing the gate of FIG. 5 filled with resin.
Figure 6:
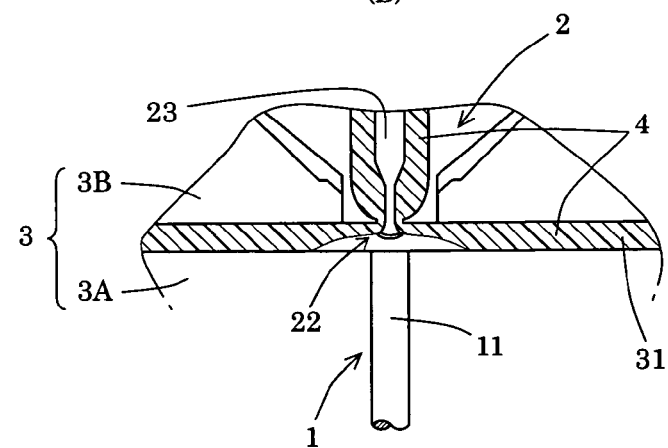
Figure 6:
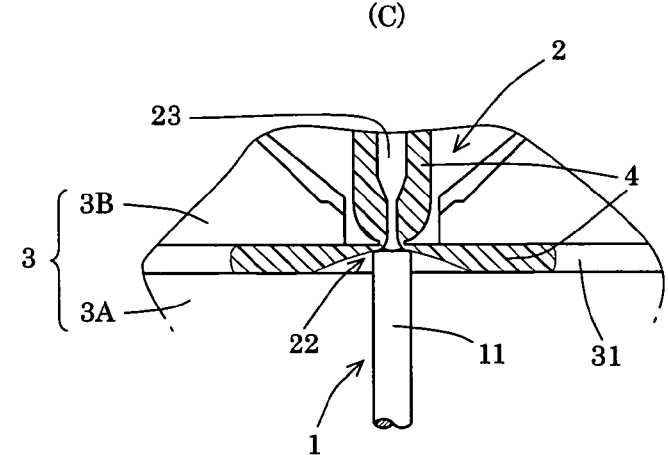

Although with structure for opening and closing the nozzle gate 22 in the embodiment shown in FIGS. 1 to 3, the gate pin 23, disposed inside the nozzle 2, escapes from the nozzle gate 22 to open the nozzle gate 22, the present invention is not restricted thereto, and as shown in FIGS. 4 to 6, an arrangement is also possible where the gate pin 23, disposed inside the nozzle 2, opens the nozzle gate 22 by projecting from the nozzle gate 22 when the resin pressure exceeds a predetermined value during filling of the molten resin and blocks the nozzle gate 22 by returning into the nozzle gate 22 when the resin pressure drops below a predetermined value upon completion of the filling of the molten resin. That is, whereas the embodiment shown in FIGS. 1 to 3 has the arrangement where the nozzle gate 22 is opened by the withdrawing of the gate pin 23 from the nozzle gate 22, the embodiment shown in FIGS. 4 to 6 has the arrangement where the nozzle gate 22 is opened by the gate pin 23 projecting (jutting out) from the nozzle gate 22.

With the opening and closing timing adjusting mechanism 1 of the embodiment shown in FIGS. 4 to 6, the respective timing pins 11 advance toward the respective nozzle gates 22 and contact the respective gate pins 23 to restrict the projection of the gate pins 23 from the nozzle gates 22 and thereby close the nozzle gates 22 (a state shown in FIGS. 5A and 6A) and retract from the nozzle gates 22 and release the restriction of projection of the gate pins 23 to open the nozzle gates 22 (a state shown in FIGS. 5B and 6B). That is, whereas with the embodiment shown in FIGS. 1 to 3, the nozzle gate 22 is opened and closed directly by the advancing and retracting of the timing pin 11, with the present embodiment, the nozzle gate 22 is not opened and closed directly by the advancing and retracting of the timing pin 11 but is opened and closed indirectly by restricting and releasing the restricting of the operation of the gate pin 23 that opens and closes the nozzle gate 22.

Because with the embodiment shown in FIGS. 4 to 6; the timing pin 11 contacts the gate pin 23 to restrict the operation of the gate pin 23, the tip shape of the timing pin 11 is preferably a shape that comes not in point contact but comes in plane contact with the tip of the gate pin 23 when the timing pin 11 advances and contacts the nozzle gate 22. In a case where the tip shape of the gate pin 23 is a spherical, convex shape as shown in FIGS. 4 to 6, a spherical, concave portion 11B that corresponds to the spherical, concave shape is preferably formed, for example as shown in FIG. 7B.

In FIG. 4, the portions, which are besides those of the arrangement for opening and closing the nozzle gate 22 by the gate pin 23 and which are provided with the same symbols as those of FIG. 1, are the same in arrangement as those of FIG. 1.

Also, as with FIGS. 2 and 3, FIGS. 5 and 6 are diagrams for describing the operation position states of the timing pin 11 during opening and closing of the nozzle gate 22 (with FIGS. 5A and 6A showing the closed state, FIGS. 5B and 6B showing the open state, and FIGS. 5C and 6C showing a half-open state), and FIGS. 5A to 5C and 6A to 6C show the same arrangement, with FIG. 5 showing states with the molten resin 4 omitted from illustration and FIG. 6 showing states with the molten resin 4 being illustrated.

Furthermore, even with the embodiment, shown in FIGS. 4 to 6, having the arrangement where the gate pin 23 projects from the nozzle gate 22, nozzles of any arrangement other than the open gate arrangement, with which there is a problem that the nozzle gate cannot be made large, that is, any of publicly known or used nozzles having the structure with which the nozzle gate 22 is opened and closed by the gate pin 23 may be employed. Specifically, any of publicly known or used nozzles with a structure where the nozzle gate 22 is opened and closed by pneumatic pressure, hydraulic pressure, or spring arrangement, etc., may be employed.

What is claimed is:

1. A multiple gate injection molding machine, comprising:
    a plurality of resin injecting nozzles with nozzle gates, each of said nozzles having a gate pin disposed therein and movable between an open position opening the respective nozzle gate when resin pressure in the respective nozzle exceeds a predetermined value and a closed position closing the respective nozzle gate when resin pressure in the respective nozzle falls below the predetermined value; and
    a nozzle gate opening and closing mechanism including timing pins disposed on at least a portion of surfaces of an injection mold opposing said nozzle gates and movable in advancing directions toward said nozzle gates and retracting directions away from said nozzle gates between advance positions closing the respective nozzle gates and retracted positions opening said nozzle gates;
    whereby said nozzle gates are opened and closed by one of movement of said timing pins only and by coordinate movement of said gate pins and said timing pins.

2. A multiple gate injection molding machine according to claim 1 wherein each said nozzle gate is opened by the respective gate pin being in the open position thereof and is in a closed position by the respective gate pin being in the closed position thereof.

3. A multiple gate injection molding machine according to claim 1 wherein each said nozzle gate is opened by projecting of the respective gate pin therefrom, and is closed by returning the respective gate pin toward the respective nozzle gate.

4. A multiple gate injection molding machine according to claim 1 wherein each said nozzle gate has an exit side toward which the respective timing pin advances and contacts to close that nozzle gate and from which the respective timing pin retracts to open that nozzle gate; and opening and closing timings of said nozzle gates are adjustable by individually controlling movement of each said timing pins in the advancing and retracting directions relative to an opposing one of said nozzle gates.

5. A multiple gate injection molding machine according to claim 3 wherein each said nozzle gate is closed by the respective timing pin advancing toward an opposing one of said nozzle gates and thereby restricting projection of the respective gate pin from the respective nozzle gate; and opening and closing timings of said nozzle gates are adjustable by individually controlling movement of each said timing pins in the advancing and retracting directions relative to an opposing one of said nozzle gates.

6. A multiple gate injection molding machine according to claim 1 wherein an advancing stroke amount of each said timing pin is adjustable.

7. A multiple gate injection molding machine according to claim 1 wherein said timing pins are disposed at a movable mold.

8. A multiple gate injection molding machine according to claim 1 wherein before start of resin filling, at least one of said timing pins is advanced to close the respective nozzle gate; and at the start of resin filing, a resin injectable state is attained by making the at least one of the timing pins retract at any timing to open the respective nozzle.

9. A multiple gate injection molding machine according to claim 8 wherein during resin filing, any one of said nozzle gates is forcibly closed by advance of the respective timing pin.

10. A multiple gate injection molding machine according to claim 9 wherein during resin filing, any one of said nozzle timing pins is adjustable by an amount in the advancing direction to an intermediate position to adjust injection flow of resin from the respective nozzle gate.

\* \* \* \* \*